(12) United States Patent
Shi et al.

(10) Patent No.: US 6,920,090 B2
(45) Date of Patent: Jul. 19, 2005

(54) METHOD FOR CONTROLLING THE SWITCHING OPERATION BETWEEN PERSONAL COMPUTER AND OPTICAL DISK DRIVE

(75) Inventors: Caviar Shi, Shentsun (CN); Jones Lai, Taipei Hsien (TW)

(73) Assignee: Via Technologies, Inc., Taipei (TW)

( * ) Notice: Subject to any disclaimer, the term of this patent is extended or adjusted under 35 U.S.C. 154(b) by 178 days.

(21) Appl. No.: 10/248,412

(22) Filed: Jan. 17, 2003

(65) Prior Publication Data
US 2003/0179659 A1 Sep. 25, 2003

(30) Foreign Application Priority Data
Mar. 22, 2002 (TW) ........................................ 91105533 A

(51) Int. Cl.[7] ............................................. G11B 21/08
(52) U.S. Cl. .................. 369/30.27; 369/30.36
(58) Field of Search ...................... 369/30.27, 2, 33.01, 369/1, 3; 710/14, 11, 10, 3, 260, 262, 264; 700/11, 22, 23

(56) References Cited

U.S. PATENT DOCUMENTS

| | | | | |
|---|---|---|---|---|
| 5,870,355 A | * | 2/1999 | Fujihara | 369/30.27 |
| 5,910,933 A | * | 6/1999 | Moore | 369/2 |
| 5,974,008 A | * | 10/1999 | Lee | 369/30.36 |
| 6,014,351 A | * | 1/2000 | Kinoshita et al. | 369/30.27 |
| 6,226,237 B1 | * | 5/2001 | Chan et al. | 369/30.27 |
| 6,512,722 B2 | * | 1/2003 | Kumagai | 369/30.05 |

* cited by examiner

*Primary Examiner*—Tan Dinh
(74) *Attorney, Agent, or Firm*—Chyun IP Office

(57) ABSTRACT

Disclosed is an optical disc drive sharing switching device, method and associated application system. The optical disc drive sharing switching device integrates a personal computer and an optical disc player together inside an information-processing appliance. The personal computer and the optical disc player share the use of an optical disc drive. The user is free to switch connections between the personal computer and the optical disc player with the optical disc drive. The device uses a simple switching program and the computer functions normally even if the optical disc drive is not under its control.

20 Claims, 8 Drawing Sheets

| INPUTS | | | OUTPUTS | |
|---|---|---|---|---|
| $\overline{CLR}$ | A | B | Q | $\overline{Q}$ |
| L | X | X | L | H |
| X | H | X | L | H |
| X | X | L | L | H |
| H | L | ↑ | ⊓_ | ⊔‾ |
| H | ↓ | H | ⊓_ | ⊔‾ |
| ↑ | L | H | ⊓_ | ⊔‾ |

FIG. 7B

METHOD FOR CONTROLLING THE SWITCHING OPERATION BETWEEN PERSONAL COMPUTER AND OPTICAL DISK DRIVE

CROSS REFERENCE TO RELATED APPLICATIONS

This application claims the priority benefit of Taiwan application Ser. No. 91105533, filed Mar. 22, 2002.

BACKGROUND OF INVENTION

1. Field of Invention

The present invention relates to an optical disc application system. More specifically, the present invention relates to an optical disc drive sharing switching device, method and its associated application system.

2. Description of Related Art

Due to rapid advance in electronic technologies, the development of information storage media also progresses quickly. In the past, magnetic storage was the dominant media form. Today, optical disc storage media has largely replaced magnetic storage because an optical disc is capable of holding vast quantities of easy-to-access data. Moreover, an optical storage medium generally provides better quality audio-video reproduction. Consequently, compact disc storage devices and optical disk players are often incorporated into a personal computer to provide high-quality images and sounds.

However, at present, a product that integrates a personal computer and an optical disc player is still absent in the market, not to mention an integrative computer/disc player unit using the same disc drive.

SUMMARY OF INVENTION

Accordingly, one object of the present invention is to provide an optical disc drive sharing switching device, method and associated application system capable of integrating a personal computer and an optical disc player together so that the same optical disc drive is shared by the personal computer and the optical disc player. Furthermore, when the computer is not in control of the optical disc drive, there is no need to re-boot the computer and the personal computer may still function normally without the optical disc drive.

To achieve these and other advantages and in accordance with the purpose of the invention, as embodied and described herein, the invention provides an optical disc drive sharing switching device for switching the control of the shared optical disc drive between a first advanced technology attachment with packet interface (ATAPI interface) of a personal computer and a second ATAPI interface. The optical disc drive sharing switching device includes a reset signal generator, an interrupt signal generator and a switch control unit. The reset signal generator generates a reset signal having an ATAPI interface format. The interrupt signal generator generates a plurality of continuous interrupt signals having an ATAPI interface format. The switch control unit couples with the reset signal generator and the interrupt signal generator for receiving a switching command and switching the data signal communication linking the first ATAPI interface and the second ATAPI interface to the optical disc drive. During the switching operation, the reset signal is utilized to reset the shared optical disc drive. When the connection to the first ATAPI interface is switched to the second ATAPI interface, the continuous interrupt signals are fed to the first ATAPI interface so that the personal computer may continue to function normally without the optical disc drive.

The optical disc drive sharing switching device according to this invention may also be applied to an optical disc drive sharing system. The optical disc drive sharing system includes a personal computer that needs to access optical disc data and an optical disc player capable of playing audio-video data found on an optical disc. In this system, the optical disc drive sharing switching device further includes a power control unit for cutting off the power to the optical disc player when the second ATAPI interface of the optical disc player is switched to the first ATAPI interface of the personal computer. Hence, power is saved and the lifespan of the equipment is extended. The optical disc drive can be a digital versatile disc (DVD) drive or a VCD drive and the continuous interrupt signals have a frequency around 230 Hz.

This invention also provides a switching method for sharing the use of an optical disc drive. The method is applied to switch signal connection between a first ATAPI interface and a second ATAPI interface. The method includes the following steps. First, a reset signal and a plurality of continuous interrupt signals meeting at the ATAPI interface format are provided. On receiving a switching command, the signal connection between the first ATAPI interface and the second ATAPI interface are interchanged. During the switching phase, the reset signal is used to reset the optical disc drive. As the signal connection of the first ATAPI interface is switched to the second ATAPI interface, the continuous interrupt signals are fed to the first ATAPI interface so that equipment having the first ATAPI interface may continue to function normally without the optical disc drive.

The switching method for sharing the use of an optical disc may further include cutting off the power supply to the equipment having the second ATAPI interface as the second ATAPI interface switches to the first ATAPI interface.

In brief, this invention provides an optical disc drive sharing switching device inside an information appliance having a shared optical disc drive. Hence, a personal computer and an optical disc player may be combined together to share the use of a single optical disc drive. In addition, a reset signal is used to reset the optical disc drive during the switching phase. Therefore, the personal computer or the optical disc player may use the optical disc drive after the switching process has been completed. Furthermore, when the personal computer loses the signal from the optical disc drive, due to the switching to the optical disc player, a plurality of continuous interrupt signals are sent to the personal computer permitting the computer to function normally in the absence of an optical disc drive without the need for re-booting the computer.

It is to be understood that both the foregoing general description and the following detailed description are exemplary, and are intended to provide further explanation of the invention as claimed. This description will become more evident with reference to the drawings and preferred embodiments of the present invention.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 7B is a truth table of a dual-channel mono-stable edge-triggering device used according to one preferred embodiment of this invention.

DETAILED DESCRIPTION

Figure 1:
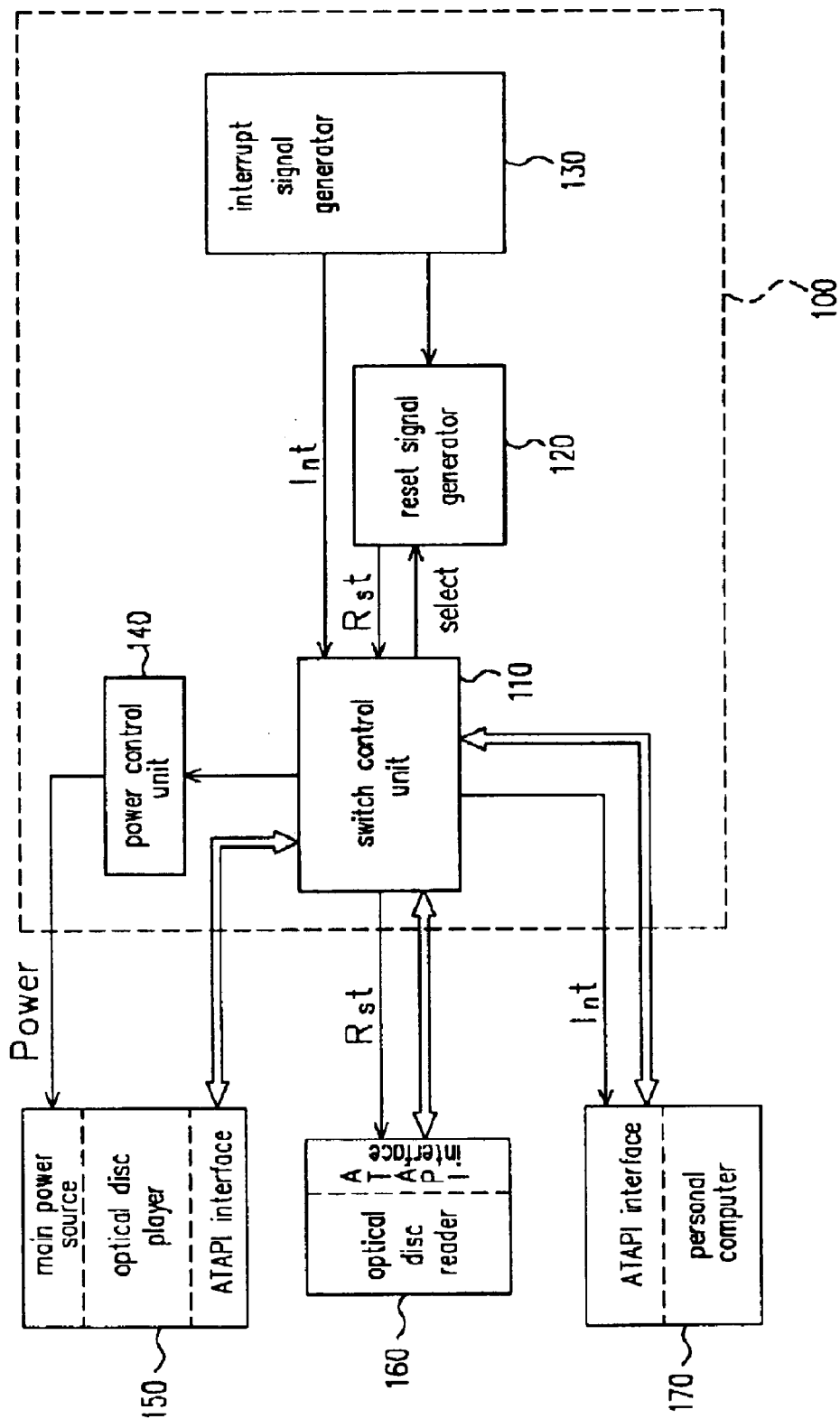
FIG. 1 is a block diagram showing an optical disc drive sharing switching device and associated application system according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram showing an optical disc drive sharing switching device and associated application system, according to one preferred embodiment of this invention. The optical disc drive sharing switching device (100) comprises a reset signal generator (120), an interrupt signal generator (130) and a switch control unit (110). To control the power to the ATAPI interface equipment and save energy, a power control unit (140) is also incorporated. The power control unit (140) cuts off power to a device linked to an optical disc drive (160), such as an optical disc player (150), when control of the optical disc drive (160) is replaced by another device, such as a personal computer (170). In addition to the optical disc drive sharing switching device (100), the shared optical disc drive (160), and the personal computer (170) and the optical disc player (150) which share the use of the optical disc drive sharing switching device (100), are also shown in FIG. 1. Obviously, the personal computer (170) and the optical disc player (150) must share the ATAPI interface in order to use or control the optical disc drive (160). In practical production, the optical disc drive (160) and the optical disc drive sharing switching device (100) may be combined with each other and incorporated either inside the optical disc player (150) or inside the personal computer (170) to form an integrated home appliance. The optical disc drive (160) can be a DVD drive, which can read and/or write a DVD disc, or a VCD drive, which can read and/or write a VCD disc, etc. The optical disc display (150) can be a DVD player or a VCD player, etc.

However, these drives and players raised here are only some examples of the embodiment of the present invention, and the scope of the present invention should not be limited thereby. Those skilled in the art can make some modifications or find some equivalents to use instead, or use this technique to other devices sharing the ATAPI interface devices, without departure from the spirit of the present invention.

Figure 6:
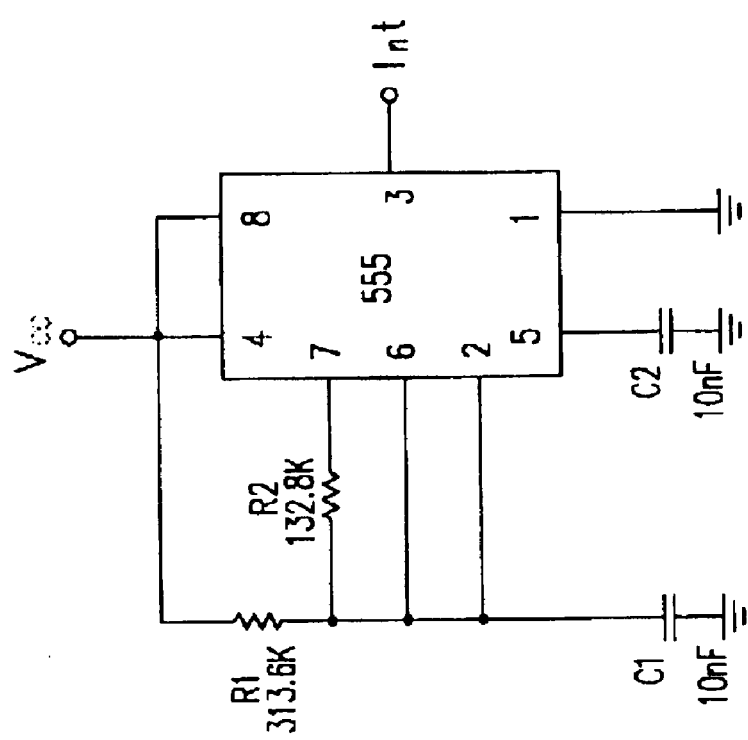
FIG. 6 is a circuit diagram of the interrupt signal generator, according to one preferred embodiment of this invention.

As shown in FIG. 1, the interrupt signal generator (130) generates a plurality of continuous interrupt signals (Int) having an ATAPI interface format. In this embodiment, a pulse generator, such as an integrated circuit NE555, together with a peripheral circuit may be used to produce a signal having a frequency around 230 Hz. Obviously, other circuits capable of generating a plurality of continuous pulse signals with a pulse width over 25 microseconds may also be used. The continuous interrupt signals (Int) are used for maintaining a dummy optical disc drive attached to the personal computer (170) as the optical disc drive (160) is switched to the optical disc player (150) after the personal computer (170) is booted and the presence of an optical disc drive (160) is detected. Hence, there is no need to re-boot the personal computer (170) and it is able to continue its normal operations. Details of the integrated circuit NE555 and its peripheral circuit are illustrated in FIG. 6. Through proper selection of resistors R1, R2 and capacitors C1, C2, an operating frequency around 230 Hz and a duty cycle of around 50% is easily obtained.

Figure 7A:
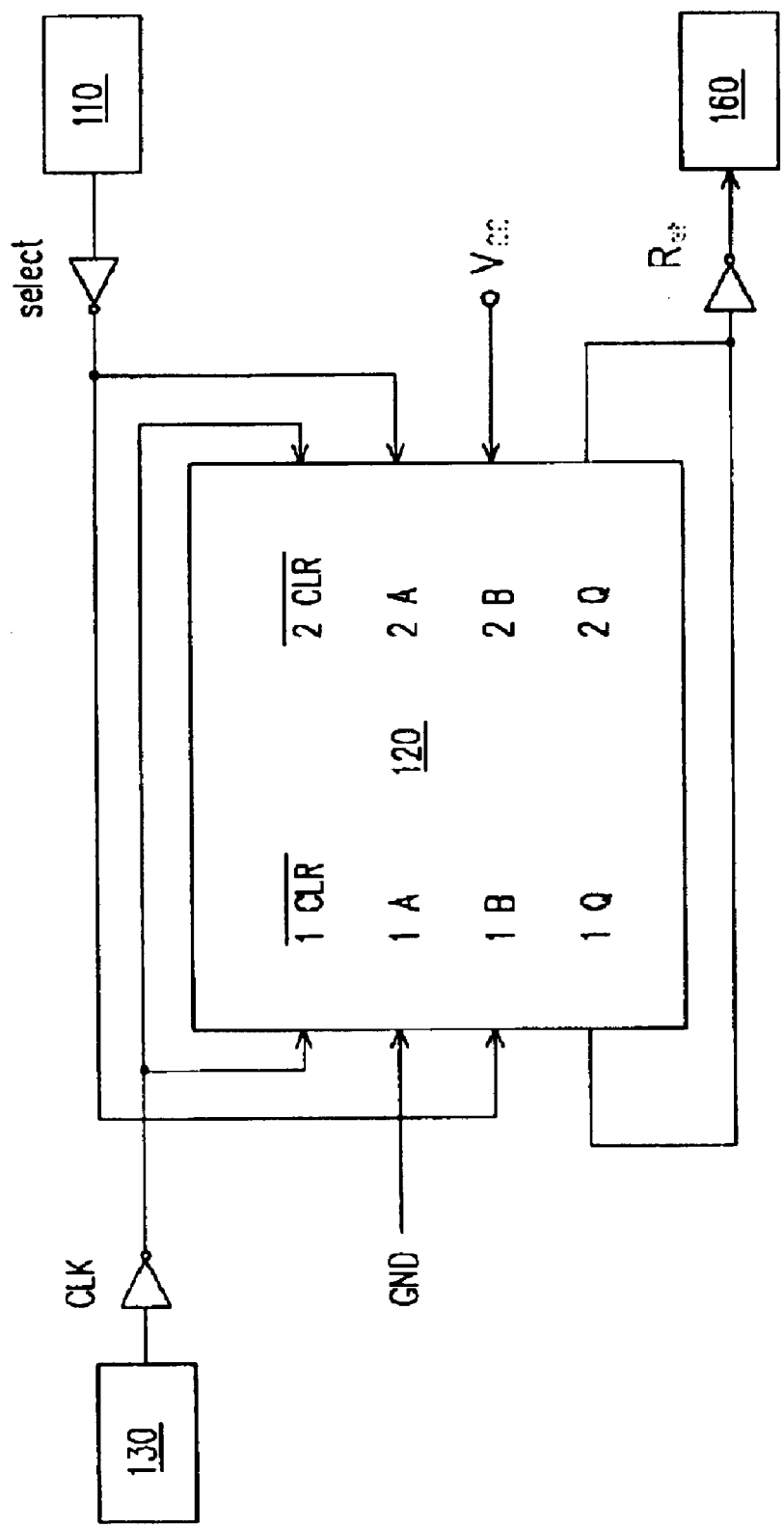
FIG. 7A is a circuit diagram of the reset signal generator, according to one preferred embodiment of this invention.

The reset signal generator (120) generates a reset signal (Rst) having an ATAPI interface format. The reset signal (Rst) must be greater than 25 microseconds. In this embodiment, the pulse signal generated by the integrated circuit NE555 is transmitted; to a dual-channel mono-stable edge-triggering device, such as the device 74HC221, to produce the reset signal (Rst). A circuit diagram of the reset signal generator (102) and its related truth table are shown in FIGS. 7A and 7B respectively. As shown in FIGS. 7A and 7B, when the signal line SELECT from the switch control unit (110) changes state (from a logic "0" to "1" or vice versa), the reset signal generator (120) generates a reset signal (Rst) and transmits the signal to the optical disc drive (160). Obviously, other circuits capable of generating a reset signal (Rst) may be employed. The reset signal (Rst) is used to reset the optical disc drive (160) while control is switched so that the optical disc drive (160) can be used by other equipments linked thereto after the switching operation.

The power control unit (140) controls the power to the ATAPI interface equipment, such as the optical disc player (150) described in this embodiment. The power control unit (140) may comprise a relay to control the "on-state" and "off-state" of the power of the equipment.

Figure 2:
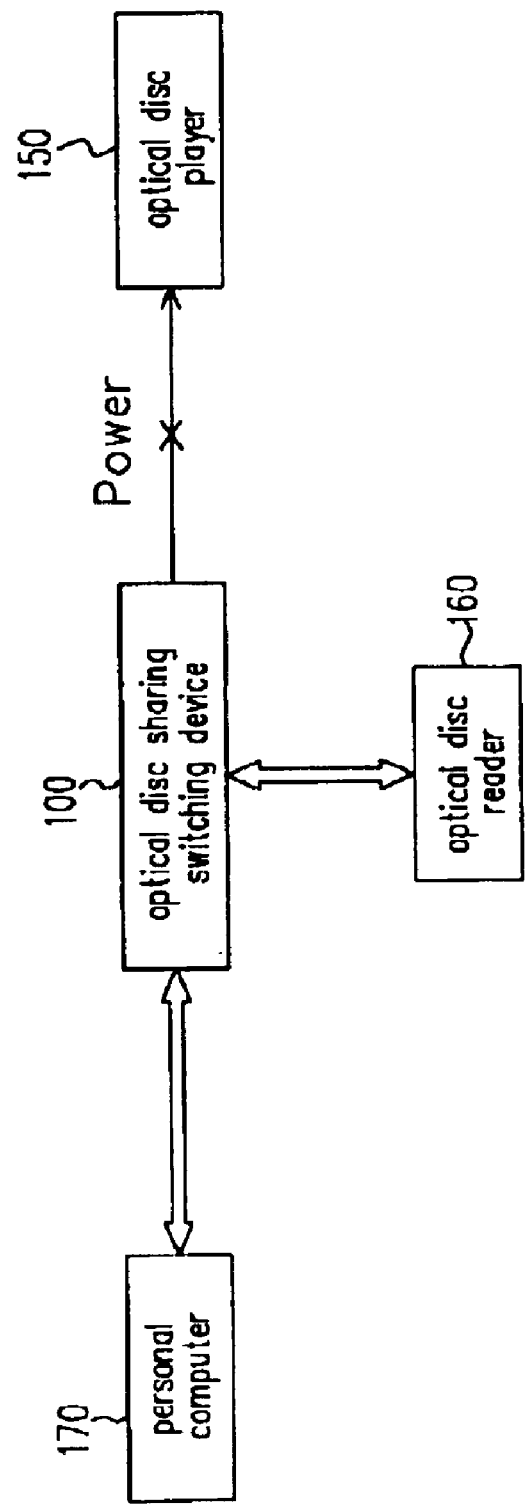
FIG. 2 is a block diagram showing an optical disc drive sharing system according to this invention in which the optical disc drive operates under the control of the personal computer.

The switch control unit (110) also couples with the reset signal generator (120) and the interrupt signal generator (130) to serve as a control center. When a switch command from a switch (not shown) is received, the switch control unit (110) issues a select signal SELECT to the reset signal generator (120). The reset signal generator (120) generates a reset signal (Rst). The reset signal (Rst) may select to connect to the optical disc drive (160) directly or via the control of the switch control unit (110) to reset the optical disc drive (160). The switch control unit (110) mainly comprises a plurality of three-channel-two-route digital analogue switches, such as a group of CD4053 devices. The switch control unit (110) is responsible for switching the connections between a first ATAPI interface of the personal computer (170) and a second ATAPI interface of the optical disc player (150) to the optical disc drive (160), according to the switching command. The switching method is shown in FIGS. 2 to 5. First, as shown in FIG. 2, the optical disc drive (160) is connected to the personal computer (170). Hence, when the personal computer (170) is switched on, the optical disc drive (160) works with the personal computer (170). Since the optical disc player (150) cannot operate due to a disconnection from the optical disc drive (160), power to the optical disc player (150) is cut off. Note that the cutting of power to the optical disc player (150) is non-essential. However, cutting off the power allows for greater energy efficiency and an extended-lifespan for the equipment.

Figure 3:
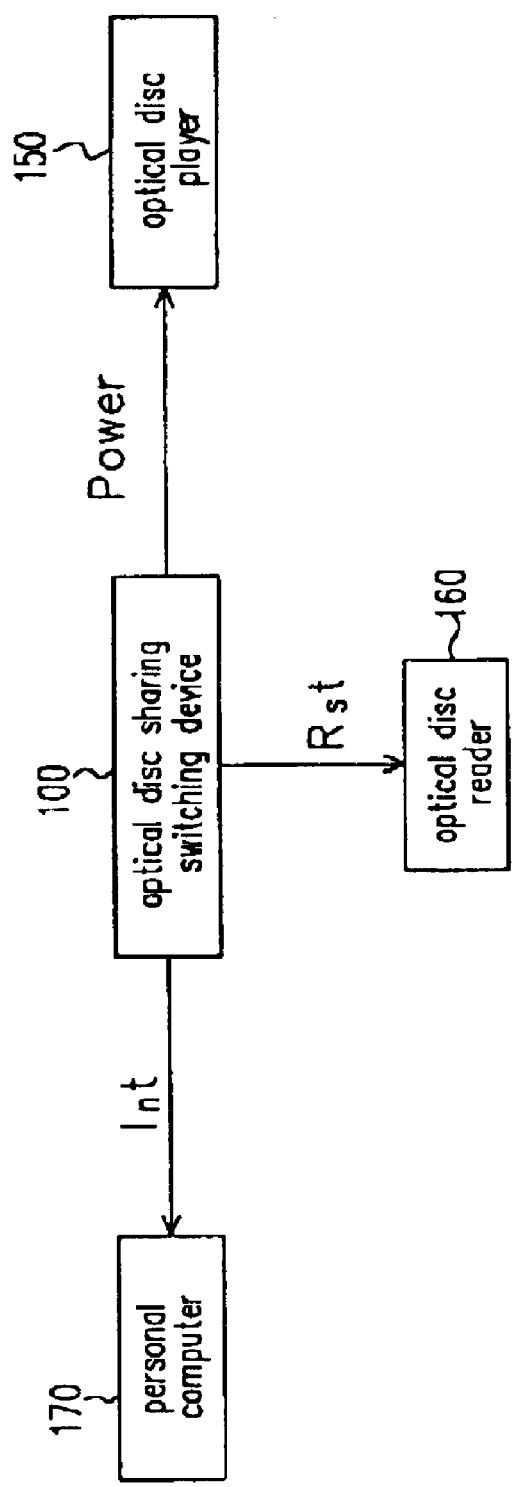
FIG. 3 is a block diagram showing an optical disc drive sharing system according to this invention, in which the control of the optical disc drive is switched from the personal computer to the optical disc player.

FIG. 3 is a block diagram showing the optical disc drive (160) in the process of switching from a connection with the personal computer (170) to a connection-with the optical disc player (150). At this moment, the optical disc drive (160) is not assigned to any one of the ATAPI interface devices. The switch control unit (110) inputs the continuous interrupt signals (Int), generated by the interrupt signal generator (130), to the personal computer (170) so that the personal computer (170) still detects a virtual optical disc drive (160) and continues to operate as usual. The reset signal (Rst), generated by the reset signal generator (120), is transmitted to the optical disc drive (160) so that the optical disc drive (160) is reset. The power source to the optical disc player (150) is also turned on to prepare for operation of the optical disc drive (160) once the connections with the optical disc player (150) are in place.

Figure 4:
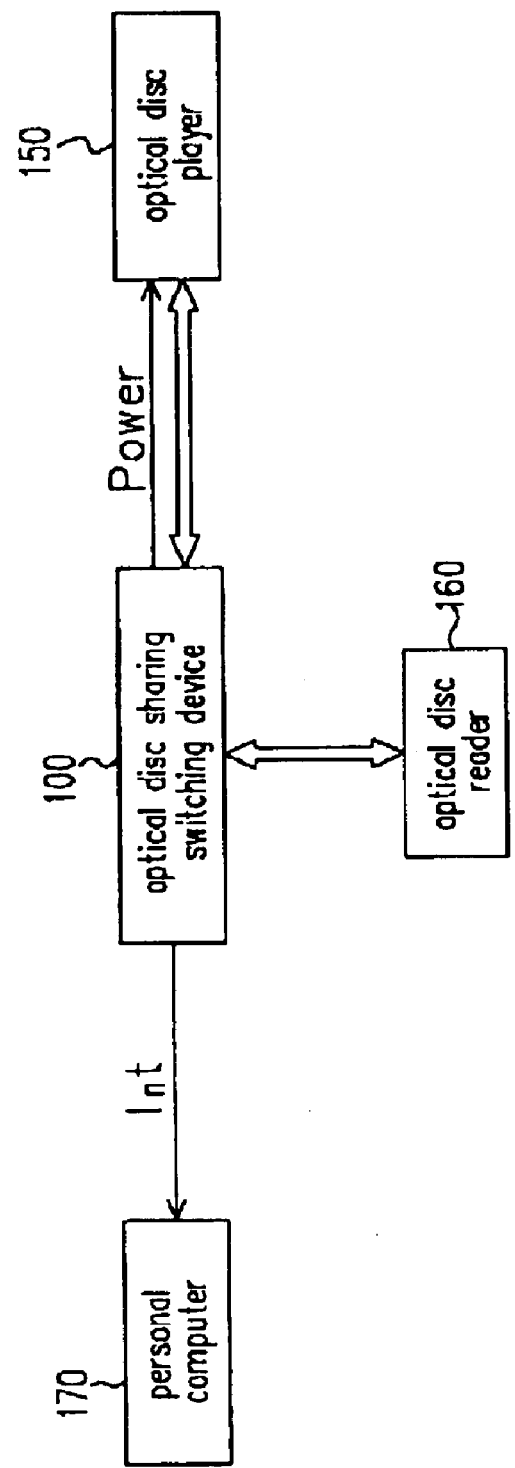
FIG. 4 is a block diagram showing an optical disc drive sharing system according to this invention in which the optical disc drive operates under the control of the optical disc player.

FIG. 4 is a block diagram showing the optical disc drive (160) fully connected to the optical disc player (150). At this moment, the interrupt signal generator (130) continues to send a plurality of continuous interrupt signals (Int) to the personal computer (170) so that the personal computer (170) still detects the presence of a virtual optical disc drive (160) and maintains its normal operations. The main power source continues to provide power to the optical disc player (150). Since the ATAPI bus of the optical disc drive (160) now connects with the optical disc player (150) and the optical disc drive (160) is formally assigned to the optical disc player (150), the playback of pictures and music through the optical disc drive (160) under the control of the optical disc player (150) is now possible.

Figure 5:
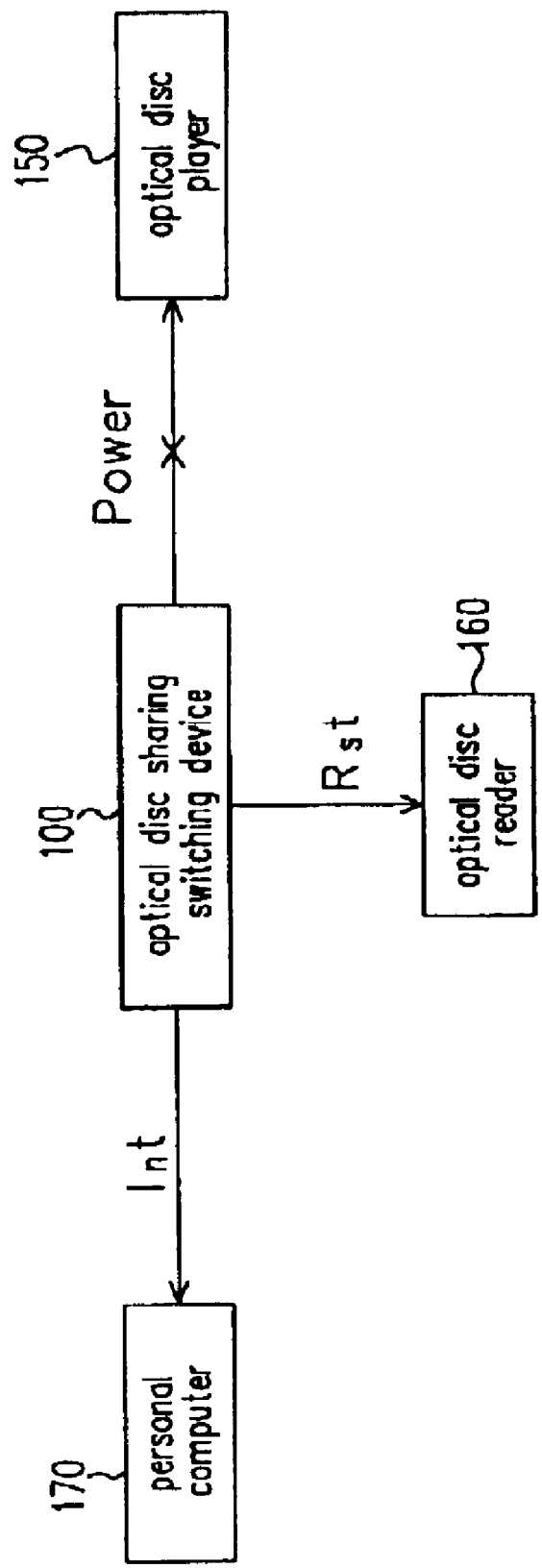
FIG. 5 is a block diagram showing an optical disc drive sharing system according to this invention in which the control of the optical disc drive is switched from the optical disc player to the personal computer.

FIG. 5 is a block diagram showing the optical disc drive (160) in the process of switching from operating with the optical disc player (150) to the personal computer (170). At this moment, the optical disc drive (160) is not assigned to any one of the ATAPI interface devices. Meanwhile, the input of a plurality of continuous interrupt signals (Int), produced by the interrupt signal generator (130), to the personal computer (170) is continued so that the personal computer (170) is still able to detect the presence of a virtual optical disc drive and continues to function normally. A reset signal (Rst), generated by the reset signal generator (120), is again transmitted to the optical disc drive (160) for resetting the drive (160) and preparing the connection with the personal computer (170). Furthermore, power to the optical disc player (150) is cut off to increase energy efficiency.

As soon as the optical disc drive (160) switches from a connection to the optical disc player (150) to a connection to the personal computer (170), the connective configuration is the same as described in FIG. 2. In this way, actual connection of the optical disc drive (160) can be selected on demand. Aside from the obvious fact that equipment disconnected from the optical disc drive (160) is unable to use the optical disc drive (160), equipment functions are unaffected. In other words, no complicated switching programs are required for sharing the optical disc drive (160).

Accordingly, a method for switching the connection with an optical disc drive between a first ATAPI interface and a second ATAPI interface can be devised. The method includes the following steps. First, a reset signal (Rst) and a plurality of continuous interrupt signals (Int) both having the ATAPI format are provided. Upon receiving a switching command, connection wires linking the optical disc drive with the first ATAPI interface and the second ATAPI interface are switched. During the switching process, the reset signal (Rst) is used to reset the optical disc drive. Furthermore, the input of a plurality of continuous interrupt signals (Int) to the first ATAPI interface is continued when the first ATAPI interface is switched to the second ATAPI interface so that the equipment containing the first ATAPI interface may continue to function normally.

The switching method may further include cutting off power to the equipment containing the second ATAPI interface when the optical disc drive connected to the second ATAPI interface is switched back to the first ATAPI interface.

In conclusion, the application of the optical disc drive sharing switching device and method in information processing appliances facilitates the integration of a personal computer with an optical disc player and the shared usage of an optical disc drive. Here, no complicated switching programs are required and the personal computer may continue to function normally despite the switching on or off of the connection with the optical disc drive. Furthermore, power to equipment not in connection with the optical disc drive may be temporarily cut off to increase energy efficiency and prolong the lifespan of the equipment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical disc drive sharing switching device for switching connections between a first interface and a second interface to an optical disc drive, comprising:
   a reset signal generator for producing a reset signal;
   an interrupt signal generator for producing a plurality of continuous interrupt signals; and
   a switch control unit coupled to the reset signal generator and the interrupt signal generator for switching the connections between the first interface and the second interface with the optical disc drive on receiving a switching command, wherein the reset signal is used to reset the optical disc drive in the switching process and the continuous interrupt signals are fed to the first interface while the connection of the optical disc drive to the first interface is switched to the second interface.

2. The switching device of claim 1, wherein the device further includes a power control unit for cutting off power to the second interface when the connection to the second interface is switched back to the first interface.

3. The switching device of claim 1, wherein the interrupt signal generator further includes a clock pulse generator.

4. The switching device of claim 1, wherein the reset signal generator further includes a clack pulse generator and a dual channel mono-stable edge-triggering device.

5. The switching device of claim 1, wherein the optical disc drive is a digital versatile disc (DVD) drive.

6. The switching device of claim 1, wherein the first interface equipment is a personal computer and the second interface equipment is an optical disc player.

7. The switching device of claim 1, wherein the continuous interrupt signals have a frequency around 230 Hz.

8. The switching device of claim 1, wherein the switch control unit further includes a plurality of three channel-two-route digital control analogue switches.

9. The switching device of claim 1, wherein the reset signal generator includes a clock pulse generator and a dual-channel mono-stable edge-triggering switch.

10. An optical disc drive sharing system, comprising:
an optical disc drive;
a personal computer capable of using the optical disc drive;
an optical disc player capable of using the optical disc drive to play back audio-video signals detected on an optical disc; and
an optical disc drive sharing switching device capable of switching connections between the personal computer and the optical disc player with the optical disc drive and permitting continuous operation of the personal computer without the need for re-booting when the personal computer is not in control of the optical disc drive,
wherein the optical disc drive sharing switching device comprising:
a reset signal generator for producing a reset signal;
an interrupt signal generator for producing a plurality of continuous interrupt signals; and
a switch control unit coupled to the rest signal generator and the interrupt signal generator.

11. The optical disc drive sharing system of claim 10, wherein the optical disc drive is a digital versatile disc (DVD) drive.

12. A method of switching of an optical disc drive shared by a first interface and a second interface between a first mode and second mode, wherein in said first mode the optical disc drive is under the control of an equipment device containing the first interface while in said second mold the optical disc drive is under the control of an equipment device containing the second interface, the method includes at least one of the two sets of the steps (A) and(B):
(A) in switching from the first mode to the second mode, comprising the steps of:
providing a switching signal of switching from the first mode to the second mode to an optical disc drive sharing switching circuit;
providing a plurality of continuous interrupt signals to the first interface;
providing a reset signal to the optical disc drive for resetting the optical disc drive; and
(B) in switching from the second mode to the first mode, comprising the steps of:
providing a switching signal of switching from the second mode to the first mode to the optical disc drive sharing switch circuit; and
providing a reset signal to the optical disc drive for resetting the optical disc drive.

13. The switching method of claim 12, wherein the switching method further includes cutting off power to the second interface equipment device when switching from the second mode to the first mode.

14. The switching method of claim 12, wherein the continuous interrupt signals have a frequency around 230 Hz.

15. The switching method of claim 12, wherein the switching method further includes turning on the power to the second interface equipment device when switching from the first mode to the second mode.

16. An optical disc drive sharing computer/optical disc player system, comprising:
an optical disc drive;
an optical disc player capable of using the optical disc drive to play back audio-video signals detected on an optical disc; and
an optical disc drive sharing switching device capable of switching connection of the optical disc drive to the computer so that the computer may use the optical disc drive,
wherein the optical disc drive sharing switching device comprising;
a reset signal generator for producing a reset signal;
an interrupt signal generator for producing a plurality of continuous interrupt signal; and
a switch control unit coupled to the reset signal generator and the interrupt signal generator.

17. The system of claim 16, wherein the optical disc drive is connected to the computer and a control of the optical disc drive is switched between the optical disc player and the computer; wherein,
the computer can run normally without the need to re-boot when the control of the optical disc drive is switched from the computer to be optical disc player.

18. The system of claim 16, wherein the optical disc drive is a digital versatile disc (DVD) drive.

19. A method of switching of an optical disc drive shared by a first apparatus and a second apparatus said first apparatus comprising a first interface and said second apparatus comprising a second interface, the method comprising:
switching said optical disc drive from a first mode to a second mode by providing a first switching signal to an optical disc drive sharing switching circuit, wherein under said first mode, said optical disc drive being controlled by said fist apparatus through said first interface, and under said second mode, said optical disc drive being controlled by said second apparatus through said second interface;
providing a plurality of continuous interrupt signals to said first interface; and
providing a reset signal to said optical disc drive for resetting said optical disc drive.

20. The method of switching of an optical disc drive of claim 19, further comprising:
switching from said second mode to said first mode by providing a second switching: signal to said optical disc drive sharing switch circuit; and
providing said reset signal to the optical disc drive for resetting the optical disc drive.

* * * * *